United States Patent
Yee et al.

(10) Patent No.: US 11,734,742 B2
(45) Date of Patent: Aug. 22, 2023

(54) EXTRACTING STRUCTURED DATA FROM VIDEO

(71) Applicant: eBay Inc., San Jose, CA (US)

(72) Inventors: Valeri J. Yee, San Jose, CA (US); Ellis Shui-Man Luk, San Francisco, CA (US); Selcuk Kopru, San Jose, CA (US); Antonio Haro, Walnut Creek, CA (US); Ashok Kumar Ramani, Saratoga, CA (US); Vikas Singh, San Jose, CA (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 17/223,659

(22) Filed: Apr. 6, 2021

(65) Prior Publication Data
US 2022/0318879 A1    Oct. 6, 2022

(51) Int. Cl.
*G06Q 30/00* (2023.01)
*G06Q 30/0601* (2023.01)
*G06F 16/583* (2019.01)
*G06F 16/58* (2019.01)

(52) U.S. Cl.
CPC ....... *G06Q 30/0625* (2013.01); *G06F 16/583* (2019.01); *G06F 16/5866* (2019.01); *G06Q 30/0641* (2013.01)

(58) Field of Classification Search
CPC .............. G06Q 30/00; G06Q 30/0601; G06Q 30/0613; G06Q 30/0641
See application file for complete search history.

(56) References Cited

U.S. PATENT DOCUMENTS

| | | | |
|---|---|---|---|
| 8,438,052 B1* | 5/2013 | Chanda | G06Q 30/0207 705/7.11 |
| 9,374,517 B2 | 6/2016 | Glasgow | |
| 9,734,634 B1 | 8/2017 | Mott et al. | |
| 9,934,522 B2* | 4/2018 | Teo | G06Q 30/0601 |
| 2002/0038255 A1* | 3/2002 | Tarvydas | G06Q 30/0635 705/26.43 |

(Continued)

OTHER PUBLICATIONS

Easton Jr, Roger L. Digital Image Processing I. Sep. 2010. (Year: 2010).*

(Continued)

*Primary Examiner* — Christopher B Seibert
(74) *Attorney, Agent, or Firm* — Shook, Hardy & Bacon L.L.P.

(57) ABSTRACT

A web-based item listing platform provides item listings that users can create or search. Item listings can be generated using structured information extracted while capturing an item listing video of the item. During creation of the item listing video, input prompts are provided to the user that cause a mobile device to provide an input request, such as taking an image of a specific feature of the item or providing some other item description information. During the item listing video, image recognition models may also be employed to determine other item description information, such as the color, the brand, and the like. The item listing can be generated from the item listing video by populating a set of structured data elements associated with an item description type. Each structured data element is populated with the item description information corresponding to the associated item description type.

20 Claims, 12 Drawing Sheets

(56) References Cited

U.S. PATENT DOCUMENTS

| | | | |
|---|---|---|---|
| 2004/0017390 A1* | 1/2004 | Knowlton | G06F 9/451 715/202 |
| 2006/0059099 A1* | 3/2006 | Ronning | G06F 21/10 705/59 |
| 2008/0288338 A1 | 11/2008 | Wiseman et al. | |
| 2009/0240735 A1* | 9/2009 | Grandhi | G06F 16/5838 |
| 2010/0042515 A1* | 2/2010 | Crespo | G06Q 30/0605 715/764 |
| 2010/0078472 A1* | 4/2010 | Lin | G06Q 20/405 235/379 |
| 2010/0153831 A1* | 6/2010 | Beaton | G06Q 30/02 715/201 |
| 2010/0185514 A1* | 7/2010 | Glazer | G06Q 30/0253 715/848 |
| 2012/0226573 A1* | 9/2012 | Zakas | G06Q 30/0207 705/26.7 |
| 2012/0287243 A1* | 11/2012 | Parulski | H04N 13/221 348/46 |
| 2012/0323682 A1* | 12/2012 | Shanbhag | G06Q 30/0641 705/14.66 |
| 2013/0142418 A1* | 6/2013 | van Zwol | G06V 20/47 382/159 |
| 2013/0258117 A1 | 10/2013 | Penov et al. | |
| 2014/0122203 A1* | 5/2014 | Johnson | G06Q 30/0633 705/26.8 |
| 2014/0152875 A1 | 6/2014 | Tobin | |
| 2015/0206188 A1* | 7/2015 | Tanigawa | G06Q 30/0261 705/14.58 |

OTHER PUBLICATIONS

Deng, Jia, et al. "Imagenet: A large-scale hierarchical image database." 2009 IEEE conference on computer vision and pattern recognition, Ieee, 2009. (Year: 2009).*

Extended European Search Report received for European Patent Application No. 22161771.5 dated Jul. 11, 2022, 7 pages.

* cited by examiner

EXTRACTING STRUCTURED DATA FROM VIDEO

BACKGROUND

Some websites allow users to upload content that can be searched for and identified by other web users. For instance, ecommerce marketplaces allow users to upload items for sale, while streaming platforms allow users to upload content, including video, that can be streamed or downloaded by other web users. Social media platforms allow users to upload content for viewing by other web users.

Part of the benefit users receive by uploading content onto websites is that it allows the other users to find their content. To help identify content across the web, many websites try to standardize the data that is associated with the uploaded content. Without standard data, there is a possibility that the uploaded content will include missing or incorrect information, thereby making it possible that other web users cannot find or identify the content. Thus, structured data can be an important tool that allows users to effectively use a website by providing a mechanism by which the users can identify the uploaded content.

SUMMARY

At a high level, the technology relates to using video to extract structured data. In particular, a user wishes to upload content, such as an item, to a website so that other web users can identify the uploaded item.

Thus, the website provides an item listing procedure that uses the camera of a mobile device to extract structured data relevant to the item and generate an item listing from the structured data that has been extracted.

The item listing procedure captures an item listing video of the item using the camera of the mobile device. Based on the item, a set of structured data elements may be selected. The camera is activated to begin taking the item listing video of the item. While the camera is active, an input prompt is provided to the mobile device, which displays or makes audible an input request that corresponds to one of the structured data elements. Based on the input request, an input is received from the mobile device. For instance, the input request could include an instruction to orient the item in a particular direction, such as orienting the item so that the camera sees the front of the item. Once oriented in the correct direction, the camera takes a still image of the item.

After there is an input to the mobile device, such as a command to take the still image, the input is used to populate the structured data element and generate the item listing. Various types of input requests, including video requests, an audio request for an audible input at the mobile device, and a dimensional request to activate a three-dimensional scanner of the mobile device to determine a size of the item, can be provided at the mobile device, and the inputs the mobile device received in response can be used to populate the item listing. In this way, the set of structured data elements is populated to generate the item listing. This can help enable other uses to find the item on the website.

This summary is intended to introduce a selection of concepts in a simplified form that is further described in the Detailed Description section of this disclosure. The Summary is not intended to identify key or essential features of the claimed subject matter, nor is it intended to be used as an aid in determining the scope of the claimed subject matter. Additional objects, advantages, and novel features of the technology will be set forth in part in the description which follows, and in part will become apparent to those skilled in the art upon examination of the disclosure or learned through practice of the technology.

BRIEF DESCRIPTION OF THE DRAWINGS

The present technology is described in detail below with reference to the attached drawing figures, wherein.

DETAILED DESCRIPTION

Figure 1:
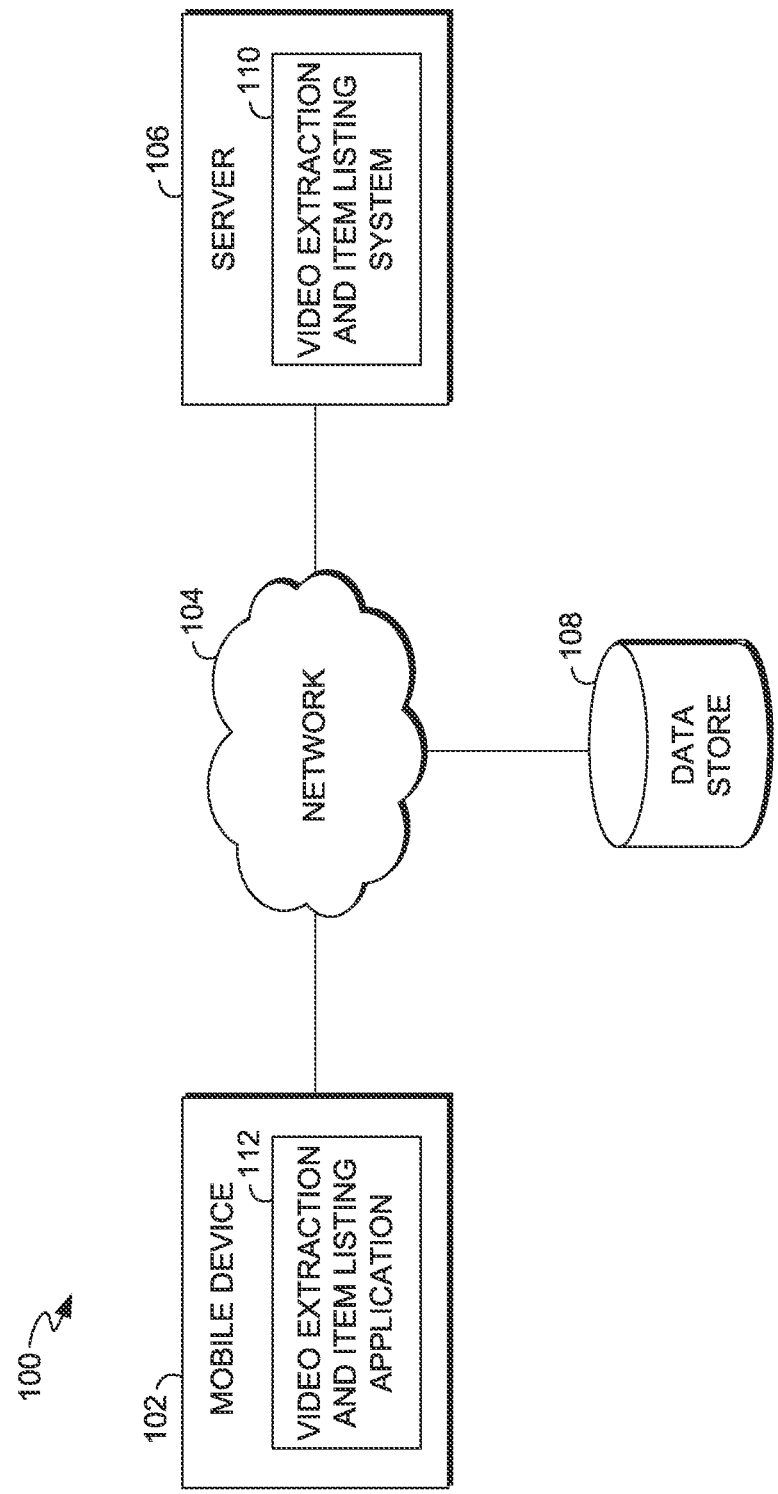
FIG. 1 is a block diagram of an example operating environment suitable for employing the technology, in accordance with an aspect described herein.

When trying to identify content, such as items, online, it can be challenging, and sometimes impossible, to identify an item if the item is not described in some structured format. Further, for websites, it is challenging to store and retrieve items, and provide such items to users, when the items are not described using the structured information. In general, while a human might be able to understand a search request and identify items described in an unstructured format, computers typically cannot without specialized context searching algorithms. Even then, the retrieval of information is still limited in context. In contrast, when items are described in a structured format, a computer can easily identify, retrieve, and provide such information to a user upon receiving a search request for this information.

Often times, however, when websites permit users to upload items, the information provided by the user is not received in a standardized format. To get around this, many websites will present users with a workflow for uploading their items. These workflows are not always a perfect solution to this problem. For instance, a user that does not know certain information may not be able to continue with the process and upload their item. A user might also respond incorrectly, and as such, the computer indexes the wrong information, making it possible that the item will not be found in a search having specific data parameters. Further still, the process requires multiple inputs by users to collect all of the information in the correct format, making the process inefficient and cumbersome.

The technology described by this disclosure reduces or eliminates many of these problems by extracting structured data using a video as part of an item listing process that generates an item listing for the item. In general, a camera can be used to extract structured data, such as images of specific orientations of an item, item color, item condition, and so forth. Machine learning can be used to recognize these description types and determine such item information from a video of the item. This reduces the number of inputs required by the user and increases the accuracy of the response.

In addition, to enhance the device's ability to capture the structured data relevant to the item, input prompts may be provided to a user to direct the user's activity toward a particular input response that includes the needed structured information. This makes it more likely that the system will capture the correct information relative to requesting the same information from the user during a non-video workflow. In turn, the information is likely to be properly indexed and available for recall, thus giving other users the ability to find and view the item. Further still, the prompts can all be provided during the video, which also reduces the amount of user input required for an item listing.

One suitable method that achieves these benefits begins by initiating a video capture procedure to activate a camera of a mobile device. The video capture procedure may comprise the mobile device's code that initiates a camera application and allows the user to view or take images captured by the camera. The camera can be used to capture an item listing video. The item listing video may be live or saved images taken by the camera of the item that the user wishes to list on a web-based item listing platform, which may include a number of item listings from third party users. The camera may be activated as part of an item listing procedure that can be provided by the platform so that users can easily create item listings through a simple video process.

The web-based item listing platform can define a set of structured data elements. This might be done per item, per item category, or for all items. In this way, the set of structured data elements might be customized to collect the most relevant information for items, as different items may have different relevant information to users. The set of structured data elements can be a set of fillable fields that are associated with an item description type. For instance, a structured data element can be associated with the item description type, "title." Another structured data element might be associated with the item description type, "brand," and so forth. In the same way, an item listing may be indexed so that the item listing can be recalled based on the item description types, such as the brand and the title. Among others, some additional example item description types include size, sale method, price, condition, color, and shipping location.

To collect the most relevant information during an item listing video, such as the information represented by the item description types for the item, a user may be prompted for particular inputs, such as an image of the item at a particular orientation, the price, the shipping location, and so on.

Since some of the item information for the structured data elements comprises images or video, the input prompt may include a video input request that requests the item be positioned in a specific orientation or the video include a particular aspect or condition of the item. As some structured data elements can include information that is not present in the video of the item, such as the price, shipping location, and so forth, the input request may include an audio input request requesting the user audibly speak the information. In yet another case, the input prompt may include a dimensional input prompt to use a three-dimensional scanner of the mobile device to determine a feature of the item, such as its size.

Input prompts may include an input request for the user to provide certain information or take a particular action. The input requests can be provided to the user using a display of the display device where the user would see the input request. Input requests may even be provided using a speaker of the mobile device so that the user hears the input request. For instance, if the input request is a video input request requesting the user orient the front of the item toward the camera, the user may see the request, e.g., "Please show the front of the item," at the display, or may hear "Please show the front of the item" over the speaker of the mobile device.

Structured data elements might also be associated with an item description type of an item feature that can be determined directly from the video using machine learning. For instance, one structured data element might be associated with the item description type, "item color." In this case, a machine learning model can be used to identify the item color from the video without prompting the user, or may prompt the user to confirm whether the color identified by the model is correct. There are numerous item description types that can be identified using machine learning, item color, item condition, brand, and model are just a few examples.

While the camera is still active capturing the item listing video, an item description type associated with "shipping location" might also be determined. This can be determined using a location service provided by the mobile device, including triangulation, satellite location services, and the like. In this case, the current location of the mobile device is determined, and an input prompt can be provided to confirm the current location is the shipping location.

In response to the input prompts, including those comprising a video input request, audio input request, dimensional input request, and the like, an item description input may be received. The item description input can be an image of the item, an audio response from the user, a dimensional response, and the like. For example, the image may be an image of a particular orientation of the item, an audible response may include item information, and the dimensional response may include a size or geometry.

Using the item description inputs that are received in response to the input requests, an item listing can be generated by populating the structured data elements with the item description inputs. This item listing may include any number and combination of populated structured data elements, but one example comprises an image of the item, the condition of the item, the type of sale, the sale price of the item, and the shipping location. In addition to or in lieu of this information, the item listing can be generated by populating structured data elements with item features identified from the machine learning.

In this way, the structured data elements of the item listing are populated with the accurate information that is indexable and can be used by others to find the item listing when navigating the item listing platform, or the web, more generally. Additionally, since many of these steps are performed while the camera is active and capturing the item listing video, the user does not have to navigate the conventional workflow, ultimately leading to fewer inputs when uploading content, such as the item listing. Thus, the method offers improvements by reducing the inputs needed by users to create listings online, while at the same time, it improves other users' ability to navigate the web, since these users have the ability to identify the uploaded item listings that they many not normally have the opportunity to identify.

It will be realized that the method just described is only an example that can be practiced from the description that follows, and it is provided to more easily understand the technology and recognize its benefits. Additional examples are now described with reference to the figures.

Turning now to FIG. 1, FIG. 1 illustrates a block diagram of example operating environment 100 in which implementations of the present disclosure may be employed. In particular, FIG. 1 illustrates a high-level architecture of search system 100 having components in accordance with implementations of the present disclosure. The components and architecture of FIG. 1 are intended as examples, as noted toward the end of Detailed Description.

Among other components or engines not shown, search system 100 includes mobile device 102. Mobile device 102 is shown communicating using network 104 to server 106 and data store 108.

The components of operating environment 100 may communicate with each other over one or more networks (e.g., public network or virtual private network "VPN") as shown with network 104. Network 104 may include, without limitation, one or more local area networks (LANs), wide area networks (WANs), or any other communication network or method.

Figure 9:
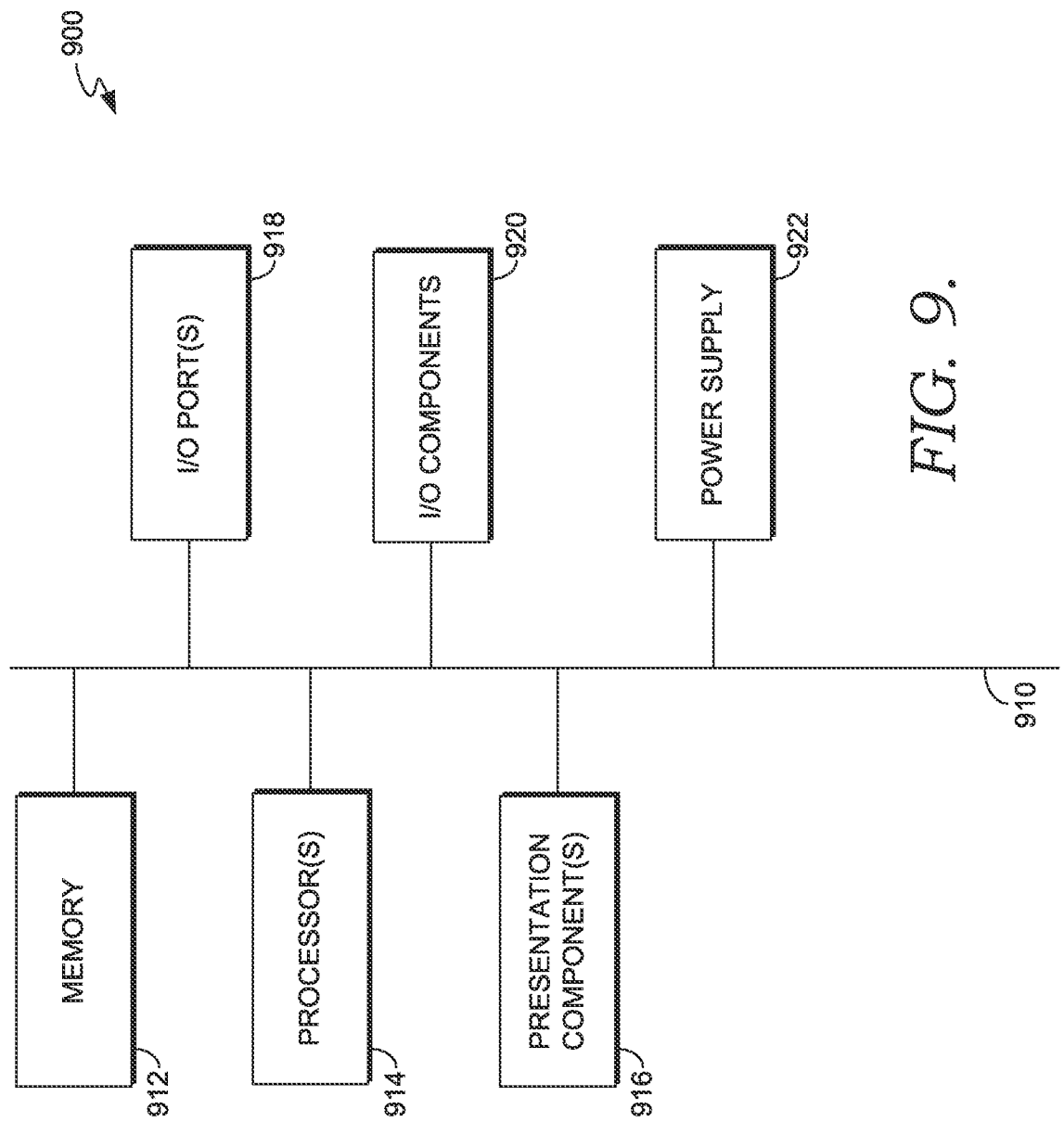
FIG. 9 is an example computing device suitable for implementing aspects of the described technology, in accordance with an aspect described herein.

Mobile device 102 may be a computing device that corresponds to the computing device described herein with reference to FIG. 9. While some examples are also described in relation to FIG. 9, some example mobile devices suitable for use with the technology include computing devices having or having access to a camera, such as smartwatches, smartphones, tablets, laptops, digital cameras, internet-of-things devices, and the like. In some implementations, mobile device 102 might be referred to as a front-end or client-side device.

As illustrated in FIG. 1, mobile device 102 comprises video extraction and item listing application 112. In general, video extraction and item listing application 112 is a software program, stored locally or remotely, that provides instructions for a processor of the mobile device to execute operations related to video extraction and item listing, which will be further discussed in relation to FIG. 2. Video extraction and item listing application may also be generally capable of facilitating the exchange of information between components of operating environment 100. Video extraction and item listing application may be embodied as a web application that runs in a web browser, which may be hosted at least partially on a server-side of operating environment 100. Video extraction and item listing application could comprise a dedicated application, such as an application having analytics functionality. In some cases, it is integrated into the operating system (e.g., as a service or program). It is contemplated that "application" be interpreted broadly.

Server 106 generally supports or is comprised as part of video extraction and item listing system 110. Server 106 includes one or more processors, and one or more computer-readable media. One example suitable for use is provided by aspects of computing device 900 of FIG. 9. The computer-readable media includes computer-executable instructions executable by the one or more processors so that the one or more processors perform operations accordingly. The instructions may optionally implement one or more components of video extraction and item listing system 110, some of which are described in relation to FIG. 2. As with other components of FIG. 1, while server 106 is illustrated as a single server, it can include one or more servers, and various components of server 106 can be locally integrated within the one or more servers or may be distributed in nature. In some implementations, server 106 may be referred to as a back-end server or on the server side.

Operating environment 100 is also shown having data store 108. Data store 108 generally stores information including data, computer instructions (e.g., software program instructions, routines, or services), or models used in embodiments of the described technologies. Although depicted as a single component, data store 108 may be embodied as one or more datastores or may be in the cloud. One example of datastore 108 includes memory 912 of FIG. 9. Data store 108 could be remote from or integrated with mobile device 102 or server 106.

Having identified various components of operating environment 100, it is again emphasized that any additional or fewer components, in any arrangement, may be employed to achieve the desired functionality within the scope of the present disclosure. Although the various components of FIG. 1 are shown with lines for the sake of clarity, in reality, delineating various components is not so clear, and metaphorically, the lines may more accurately be grey or fuzzy. Although some components of FIG. 1 are depicted as single components, the depictions are intended as examples in nature and in number and are not to be construed as limiting for all implementations of the present disclosure. The functionality of operating environment 100 can be further described based on the functionality and features of the previously-listed components.

Figure 2:
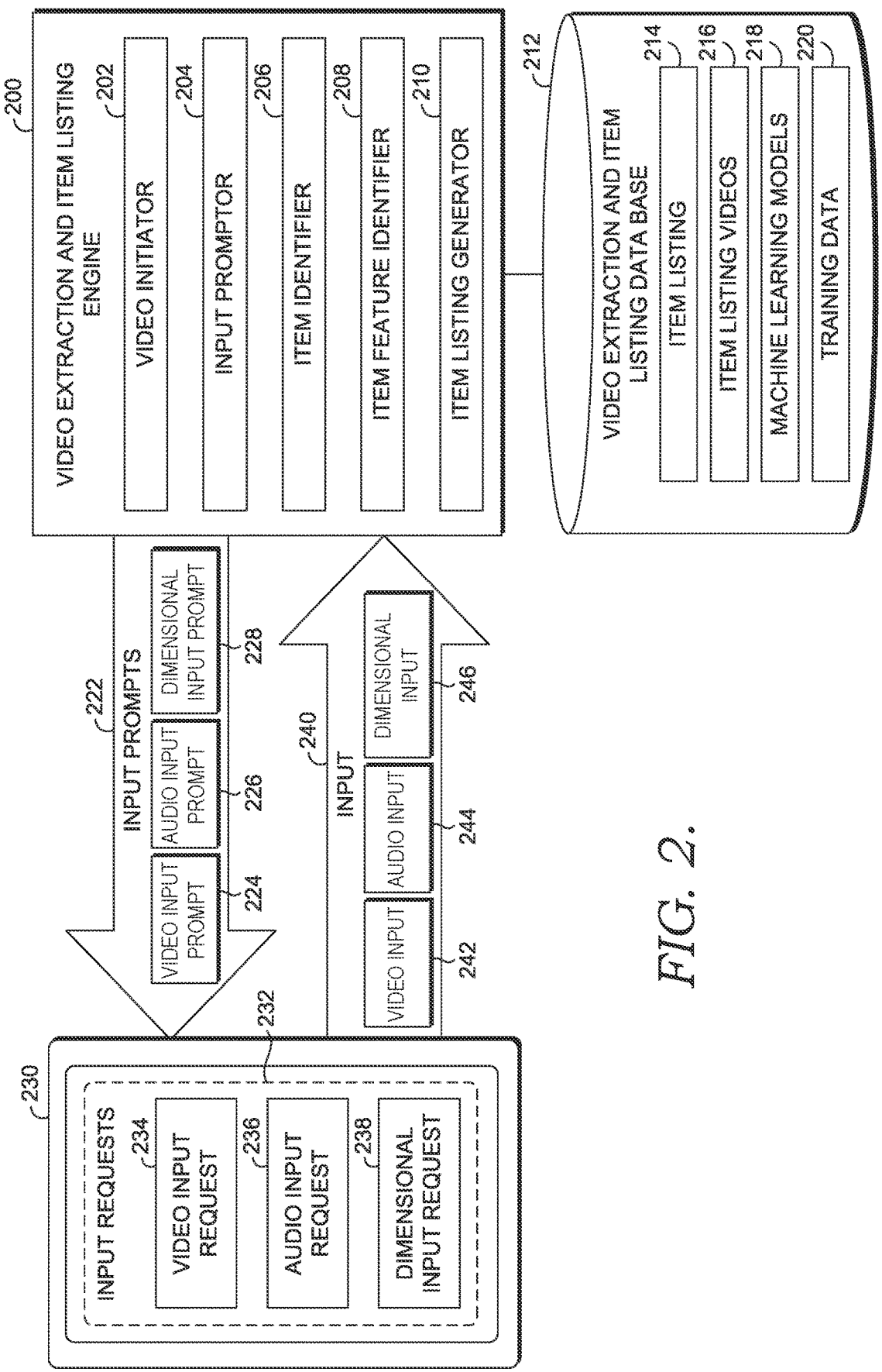
FIG. 2 is a block diagram of an example video extraction and item listing engine, in accordance with an aspect described herein.

With regard to FIG. 2, an example video extraction and item listing engine 200 is provided. Video extraction and item listing engine 200, or aspects thereof, is suitable for use as video extraction and item listing system 110 and video extraction and item listing application 112 of FIG. 1.

Many of the elements described in relation to FIG. 2 are functional entities that may be implemented as discrete or distributed components or in conjunction with other components, and in any suitable combination and location. Various functions described herein are being performed by one or more entities and may be carried out by hardware, firmware, or software. For instance, various functions may be carried out by a processor executing computer-executable instructions stored in memory. Further, the functions described in relation to FIG. 2 may be performed by either video extraction and item listing system 110, by video extraction and item listing application 112, or both. Moreover, as would be understood by those of ordinary skill, some functions could be performed by video extraction and item listing system 110 while, at the same time, others are performed by video extraction and item listing application 112. It is intended by the inventors that any combination of functions, including more or less functions, may be performed by video extraction and item listing system 110 and video extraction and item listing application 112.

Having this in mind, the example video extraction and item listing engine 200 illustrated in FIG. 2 comprises video initiator 202, input promptor 204, item identifier 206, item feature identifier 208 and item listing generator 210.

Video initiator 202 generally initiates a video capture procedure of a mobile device to activate a camera of a mobile device. That is, video initiator 202 provides an instruction to the mobile device that causes the mobile device to initiate a camera application so that the camera of the mobile device can be used to capture visual information.

The video capture procedure may be initiated as part of an item listing procedure of a web-based item listing platform. The web-based item listing platform may be a website that permits users to upload item listings and then indexes those item listings so that they can be searched by other users. The item listing procedure may be a function provided by the web-based item listing platform to facilitate the process of creating and uploading an item listing. Thus, as part of this process, the video capture procedure may be automatically or manually started by the user to upload an item listing for an item.

The item listings of the web-based item listing platform may include a set of structured data elements that, when populated, form at least part of the item listing. The set of structured data elements may be similar to fillable fields that are each associated with an item description type. The item description type generally describes the type of information that is associated with a particular structured data element. For instance, a structured data element might be associated with the item description type for "item color," while another structured data element might be associated with the item description type, "price."

Figure 3:
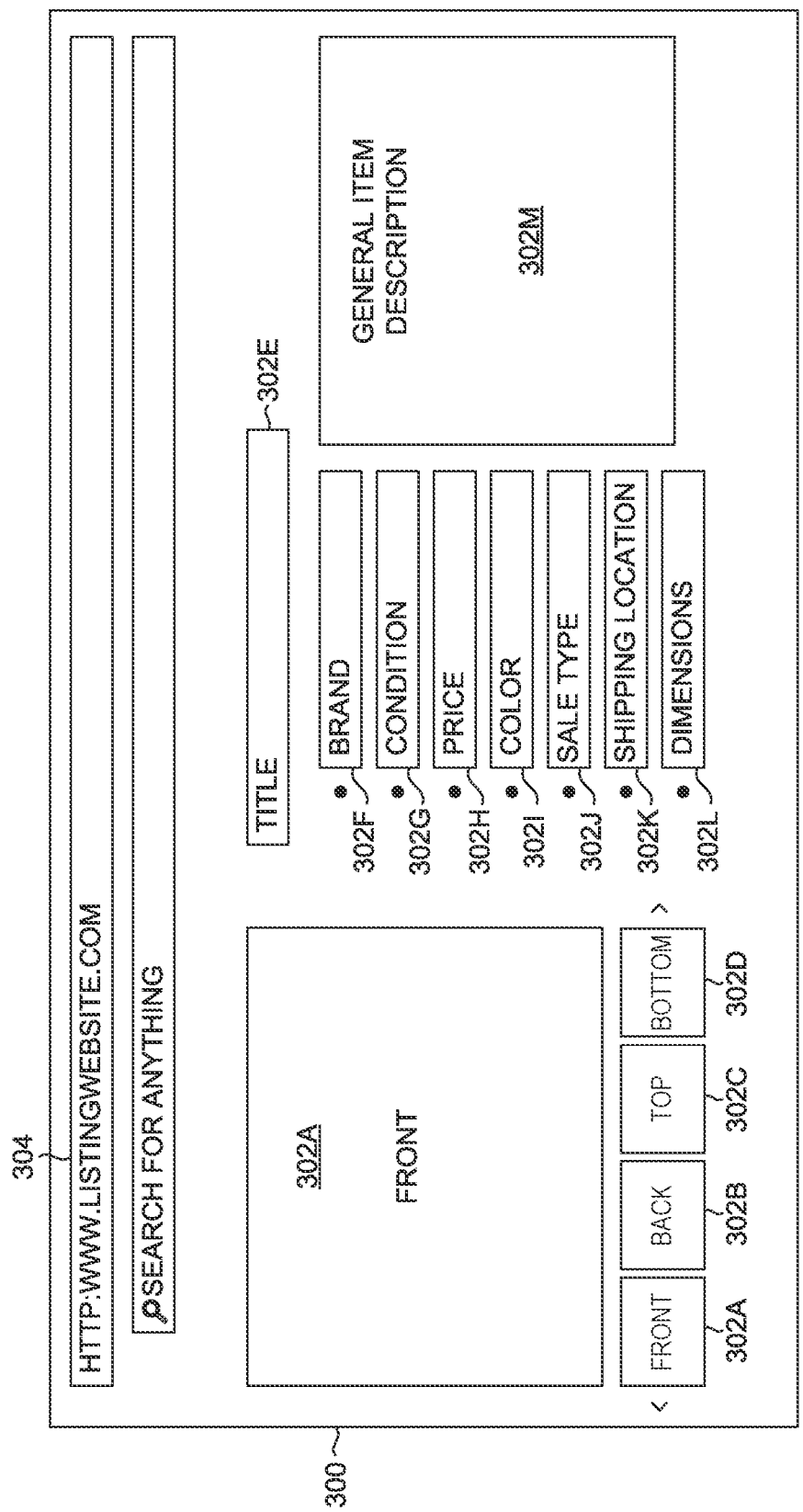
FIG. 3 is an example item listing comprising structured data elements, in accordance with an aspect described herein.

Turning briefly to FIG. 3, the figure illustrates an interface 300 displaying a webpage 304 of a web-based item listing platform. Webpage 304 is included to illustrate an example set of structured data elements 302A-302M of an item listing. As illustrated, first structured data element 302A is associated with item description type "Front," representing a front-view image of the item. In another example, second structured data element 302B is associated with "Back," representing a back-view image of the item. Continuing with this example, third structured data element 302C is associated with "Top," while fourth structured data element 302D is associated with "Bottom." Yet other examples include fifth structured data element 302E, associated with "Title"; sixth structured data element 302F, associated with "Brand"; seventh structured data element 302G, associated with "Condition" eighth structured data element 302H, associated with "Price"; ninth structured data element 302I, associated with "Color"; tenth structured data element 302J, associated with "Sale Type"; eleventh structured data element 302K, associated with "Shipping Location"; twelfth structured data element 302L, associated with "Dimensions"; and thirteenth structured data element 302M, associated with "General Item Description." This is only one example set of structured data elements, and it will be understood that item listings can be associated with a different set that includes more or less structured data elements.

The technology may also be implemented so that the set of data elements is selected based on the item. That is, some items may have information that is specifically relevant to that item, but might not be relevant to other items. For instance, a shirt could have an item description type for "Size," while this may not be relevant to another item for a bread proofing basket. As such, the set of structured data elements that will be provided as part of the item listing may be selected based on the item type. In one example, an index is created for structured data elements relative to sets of structured data elements. When the item is provided by the user for listing, then the index can be referenced and the associated set of structured data elements can be selected. In another implementation, the system searches for a same item or similar item for which a user is creating the item listing. This may be done by querying item listings 214 of video extraction and item listing database 212. Once identified, the set of structured data elements selected for population by the user in creating the item listing is determined based on the information, including item description types, provided with the same or similar item.

Video extraction and item listing database 212 is a datastore that can be used by components of video extraction and item listing engine 200 to store or retrieve information. Data store 108 of FIG. 1 is an example suitable for use as video extraction and item listing database 212.

With reference again to FIG. 2 and video initiator 202, the item listing video for which the camera is activated includes both a captured video that can be stored or live video information captured by the camera and received by the mobile device or other system components. For an item listing video that is captured and stored, the item listing video may be stored in item listing videos 216 of video extraction and item listing database 212.

Upon activation of the camera by video initiator 202 for the item listing video, the user places the item in the field of view of the camera. During capture of the item listing video, input promptor 204 provides an input prompt, such as input prompts 222 to the mobile deice. In FIG. 2, input prompts 222 are illustrated as being provided to mobile device 230. Mobile device 102 of FIG. 1 is an example suitable for use as mobile device 230 of FIG. 2.

In general, an input prompt provided by input promptor 204 may include an input request, such as input requests 232. As an example, the input prompt is the instruction provided by input promptor 204 that instructs mobile device 230 to provide an input request to the user. The input request may include a request for an action or information that is associated with an item description type of a structured data element of the set of structured data elements, and is provided to the user by displaying the input request on a display of the mobile device or providing the input request using a speaker of the mobile device. Input promptor 204 may provide a prompt to facilitate identification of a specific item feature. For instance, input promptor 204 may provide an input prompt initiated based on an image recognition model identify a specific item feature. For instance, if a specific item feature is identified, such as an abrasion, a brand marking, and so forth, input promptor 204 may provide an input prompt to capture an image of the specific item feature, which may include orienting a camera or item relative to the camera to capture the image.

As an example, input prompts 222 comprise video input prompt 224, audio input prompt 226, and dimensional input prompt 228. Generally, video input prompt 224 includes video input request 234 and instructs mobile device 230 to provide video input request 234. Similarly, audio input prompt 226 includes audio input request 236 and instructs mobile device 230 to provide audio input request 236. Likewise, dimensional input prompt 228 includes dimensional input request 238 and instructs mobile device 230 to provide dimensional input request 238. Dimensional input prompt 228 might also include an instruction to activate a three-dimensional scanner, such as a LIDAR scanner, of mobile device 230. In other implementations, the instruction to activate the three dimensional scanner may be provided by video initiator 202.

To provide some examples, video input request 234 can include a request for an action or instruction related to how the item is positioned in the field of view of the camera. For instance, it may comprise a request for the user to orient the item in a particular orientation relative to the camera. This might be done to get an image for an item description type associated with an image of the item, such as an image taken from a front, back, side, or bottom perspective of the item. In another example, video input request 234 might comprise a request for the user to orient the item in a matter manner where a particular feature can be viewed by the camera, such as requesting that the user show an area of wear and tear, or show an area having a brand mark.

Figure 4A:
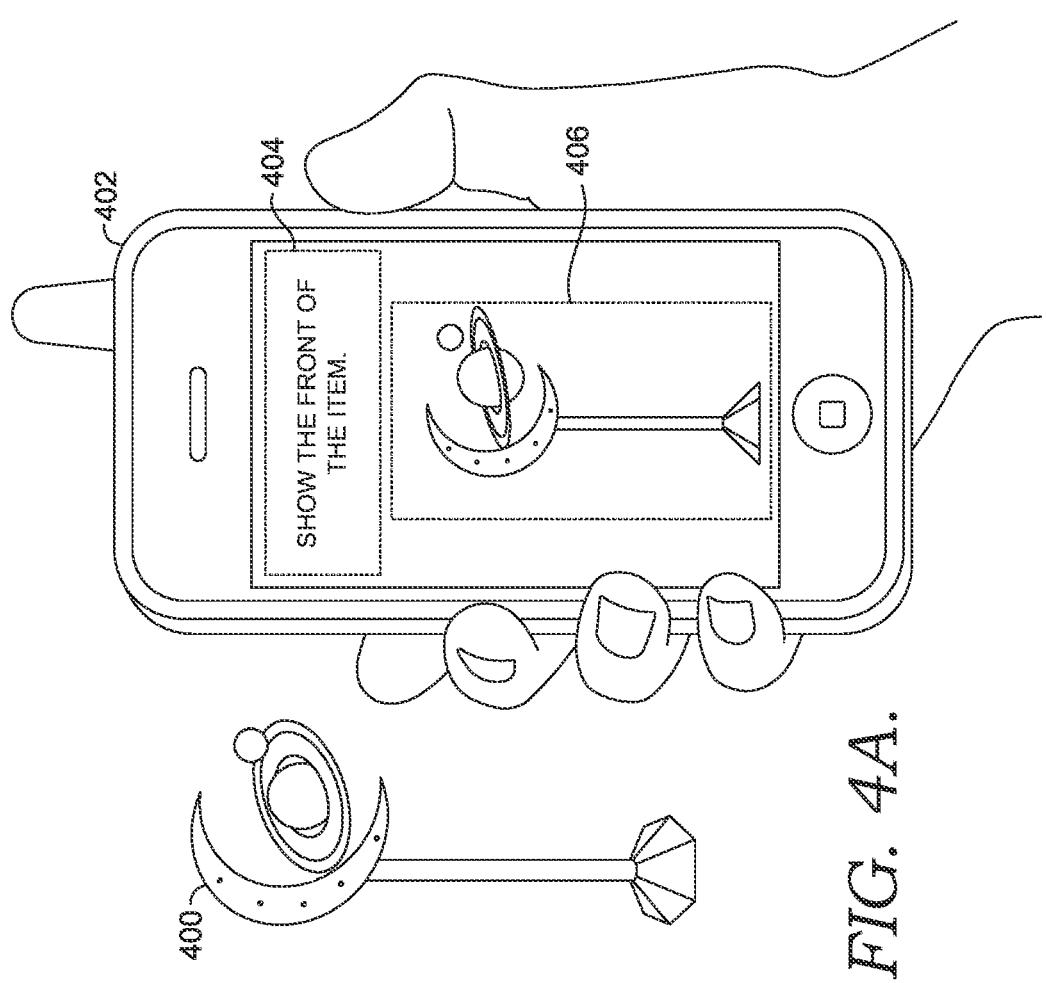
FIGS. 4A—D illustrates a series of input requests and inputs suitable for generating an item listing; in accordance with aspects described herein.
Figure 4B:
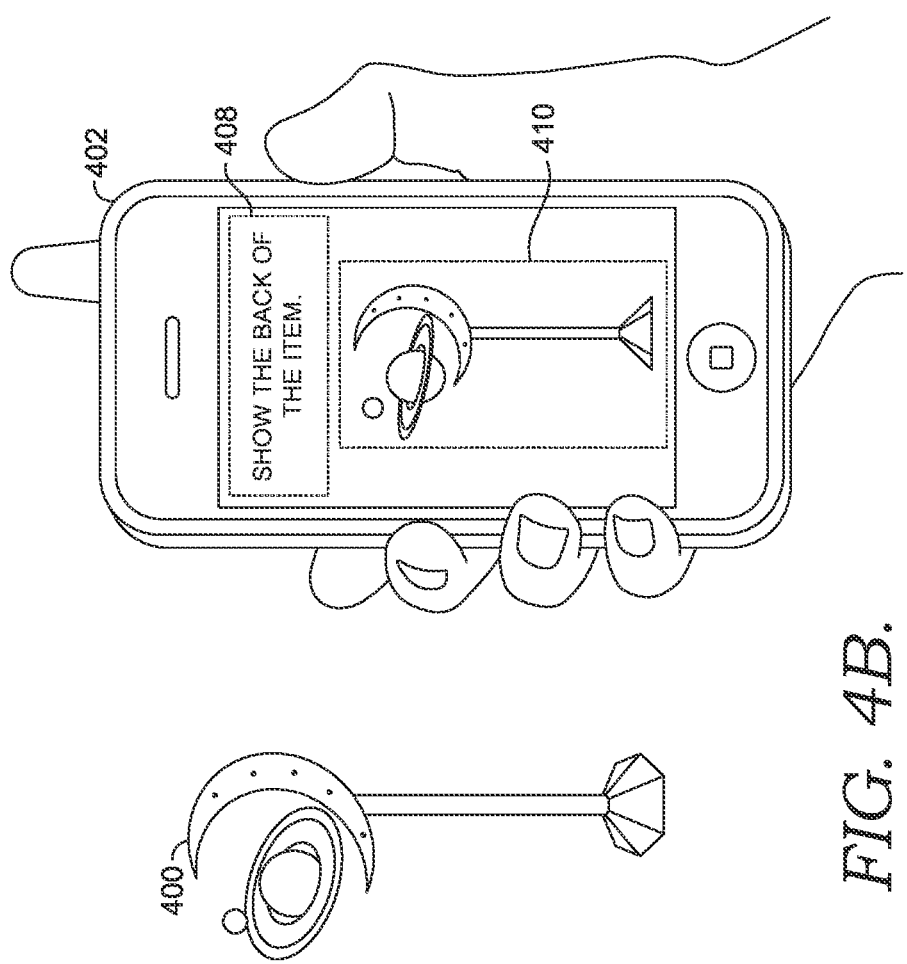

With brief reference to FIGS. 4A-4B, some example input requests are illustrated. Here, an item listing video of item 400 using mobile device 402 is illustrated. As shown, a display of mobile device 402 is displaying first video input request 404, requesting the user "Show the front of the item." This may be done in response to receiving a video input prompt, such as video input prompt 242. As illustrated, the user has oriented item 400 so that the front of item 400 is in the field of view of the camera mobile device 402.

Based on first video input request 404, first video input 406 is provided at or by the mobile device. In this case, an image capture procedure is initiated so that the camera captures a video or a still image of item 400 in the front orientation. The image capture procedure instructions include automatically capturing the image or video or capturing the image or video in response to a user input at the mobile device, such as when the user selects an input to capture the image provided at the display. When performed automatically, a machine learning algorithm trained to identify object orientation can be used to identify the orientation in response to first video input request 404, and when the orientation provided by first video input request 404 is identified, the mobile device is instructed to capture the video or still image. As will be discussed, first video input 406 may be provided to components of video extraction and item listing engine 200.

FIG. 4B provides yet another example. Here, mobile device 402 is capturing the item listing video of item 400. However, now second video input request 408 is being provided at the display, requesting the user orient item 400 so that the back of item 400 is within the field of view of the camera. In general, second input requests can be provided based on receiving an input to a first input request. Thus, in this example, second video input request 408 could be provided in response to receiving first video input 406. As shown in FIG. 4B, the user has oriented item 400 now so that a back of item 400 is in the field of view of the camera. As such, a video or image of item 400 in this orientation is captured as second video input 410. For instance, as in other aspects of the technology, a still image may be captured from item listing video 400, or the captured image data may be a video, e.g., part of the item listing video that is indexed or tagged based on a time in which the orientation is captured.

With primary reference again to FIG. 2, as described, some input requests may include audio input request 236. In general, audio input request 236 requests that the user provide some information in the form of an audible sound, such as speaking the information. Audio input request 236 may be provided when an item feature cannot be determined from a video or image. For instance, a price of an item may not be physically present on the item. This often occurs when the item of the item listing is not being listed for the first time, and it does not have a marker on it displaying a price. As such, audio input request 236 may comprise a request for a price, or other information.

Figure 4C:
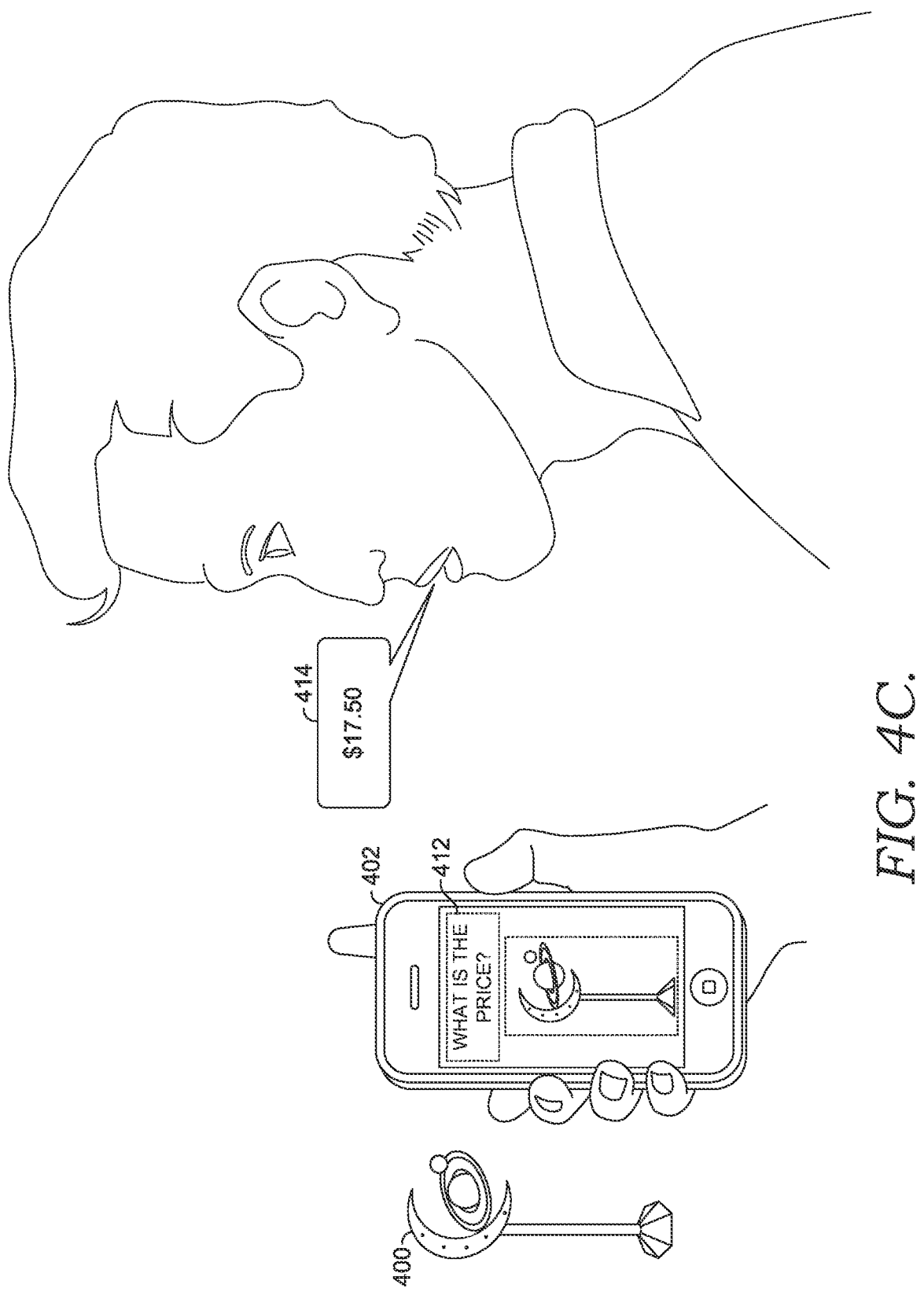

An illustration of this is provided by FIG. 4C. In FIG. 4C, the item listing video of item 400 is being captured by mobile device 402. A display of mobile device 402 is displaying to the user audio input request 412 while capturing the item listing video. In response, audio input 414 is being captured, which may be captured by a microphone of mobile device 402. Audio input 414 can be captured and provided as audio input 244 to components of video extraction and item listing engine 200 of FIG. 2. In some cases, a speech-to-text feature can be employed to generate text from an audio input, such as audio input 414.

Continuing with reference to FIG. 2, as noted, some input requests may include dimensional input request 238. Dimensional input request 238 may generally relate to a request to identify the dimensions of an item. This may include dimensions using standard measurement systems, such as dimensions of the English or Metric systems. This might also include dimensions of relative measurement systems, such as the size of a shoe.

Figure 4D:
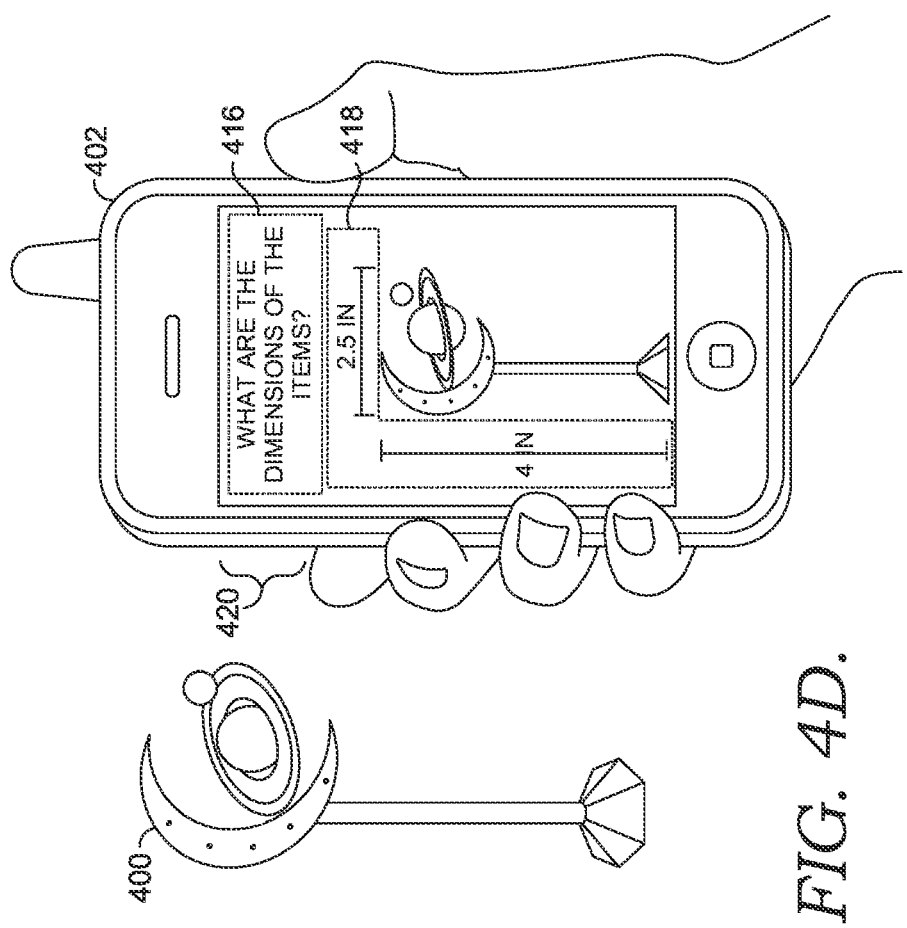

Turning to FIG. 4D, the item listing video of item 400 is being captured by mobile device 402. In this scenario, mobile device 402 is providing at its display, dimensional input request 416, which asks the user "What are the dimensions of the item?" Scanning device 420 of mobile device 402 has been activated to determine the dimensions. It will be noted that, in some cases, mobile devices have a scanning device separate from that of the camera. For instance, some mobile devices use LIDAR systems. However, the camera may also serve as the scanning device for some mobile devices. In instances, a mobile device may automatically capture the dimensions with additional input from the user. In such cases, a prompt may or may not be provided. However, since some devices might require a particular user action for measuring the dimensions using the mobile device, a dimensional input request, such as dimensional input request 238 may be provided to the user. In the context of FIG. 4D, the dimensions are measured and are provided as dimensional input 418. Dimensional input 418 may be provided to video extraction and item listing engine 200 as dimensional input 246.

Continuing with FIG. 2, video extraction and item listing engine 200 also comprises item identifier 206. Item identifier 206 generally identifies an item in the field of view of a camera of a mobile device.

Item identifier 206 can be an image recognition model that comprises a machine learning model, which may be included among machine learning models 218 in video extraction and item listing database 212. There are several machine learning models that are suitable for use by item identifier 206. Convolutional Neural Networks (CNN) are generally good at object classification and recognition and can be used. One more specific example is a Region Based CNN (R-CNN) that, once trained, can be employed by item identifier 206. Yet another example includes a single shot multibox detector algorithm (SSD). These can be trained to identify specific items. Training data 220 may include images of tagged items. One source of data that can be used are items that have previously been listed, and are tagged to include the identity of that item. The tagged images can be stored within training data 220 and used to train the machine learning model that is employed by item identifier 206. In one aspect, item identifier 206 is used to identify an item in the field of view of the camera, and the identity of the item is populated in the structured data element associated with the item description type "title." The population of the structured data element will be further discussed.

Item feature identifier 208 generally identifies item features of an item Like item identifier 206, item feature identifier 208 can be an image recognition model that comprises a machine learning model, including any of those examples previously discussed. Item feature identifier 208 may be used to identify features such as brand, color, condition, and so forth. Machine learning models may be trained and stored within machine learning models 218. One or more models may be trained to identify each feature. For instance, a model can be trained using a training data set of items that are pre-labeled based on their condition, such as new, good, and poor, among other labels that can be defined.

Likewise, labeled data sets can be used for color and brand (for example, by training the model on the brand marks). The pre-labeled training data sets for each of these can be included within training data 220. As will be discussed, the output of item feature identifier 208 can be used to populate structured data elements.

Item listing generator 210 generally generates an item listing. Item listing generator can use inputs 240, including any combination of video input 242, audio input 244, and dimensional input 246 to generate the item listing.

One method performed by item listing generator 210 includes populating structured data elements with item information from inputs 240 that correspond to the item description type associated with the item information. For instance, a video input comprising an image of the front of the item can be populated in a structured data element associated with an item description type for the front of an item. Similarly, an audio input comprising a price can be populated in a structured data element associated with an item description type for the price. This may continue through all of, or at least a portion of, the set of structured data elements for the item listing.

Another output provided by mobile device 230 may include a current location of the mobile device. The current location can be populated into a structured data element associated with shipping location by item listing generator 210. A confirmation prompt may be provided to the user to confirm the current location is the shipping location prior to populating it into the structured data element.

Figure 5:
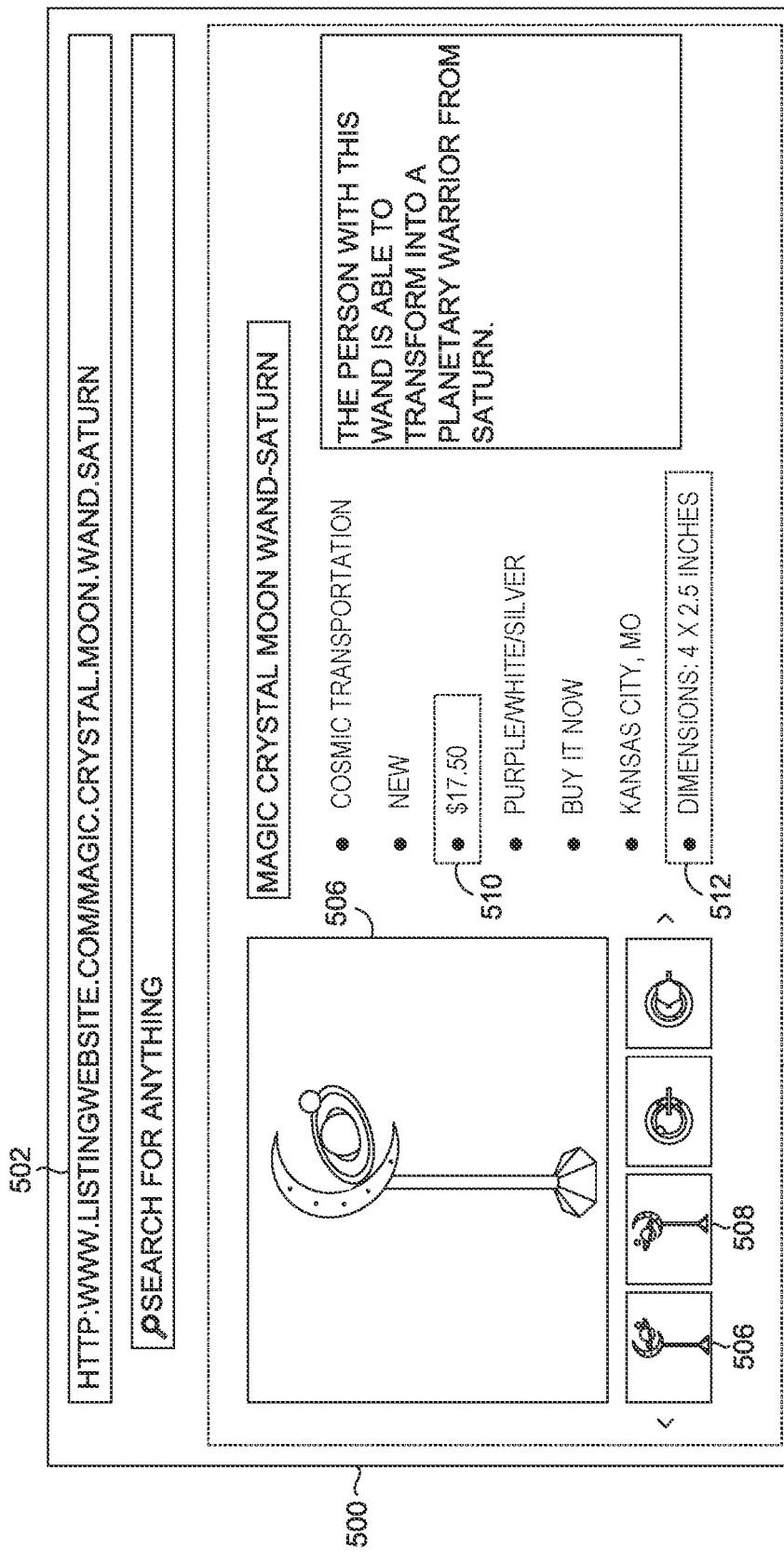
FIG. 5 is an example item listing comprising populated structured data elements, in accordance with an aspect described herein.

FIG. 5 illustrates an example item listing comprising populated structured data elements. FIG. 5 is intended to illustrate the structured data elements and the item description types that are provided in FIG. 3, which have been populated using inputs 240 from FIG. 2, as determined from the illustrations of FIGS. 4A-4D.

FIG. 5 illustrates interface 500 displaying item listing webpage 502 of a web-based item listing platform. Item listing 504 is provided at item listing webpage 502, which has been populated by item listing generator 210. Here, some examples of the populated structured data elements are also illustrated. For instance, first populated structured data element 506 corresponds to an item description type for a front image of the item, or "Front," as shown being received as first video input 406 from FIG. 4A. Second populated structured data element 508 corresponds to an item description type for a back image of the item, or "Back," as shown being received as second video input 410 from FIG. 4B. Third populated structured data element 510 corresponds to an item description type for "Price," as shown being received from audio input 414 from FIG. 4C. Fourth populated structured data element 512 corresponds for an item description type "Dimensions," as shown being received as dimensional input 418.

In this way, item listing generator 210 may populate structured data elements to generate an item listing. The item listing can be included among item listings 214 and provided to other users by the web-based item listing platform.

Figure 6:
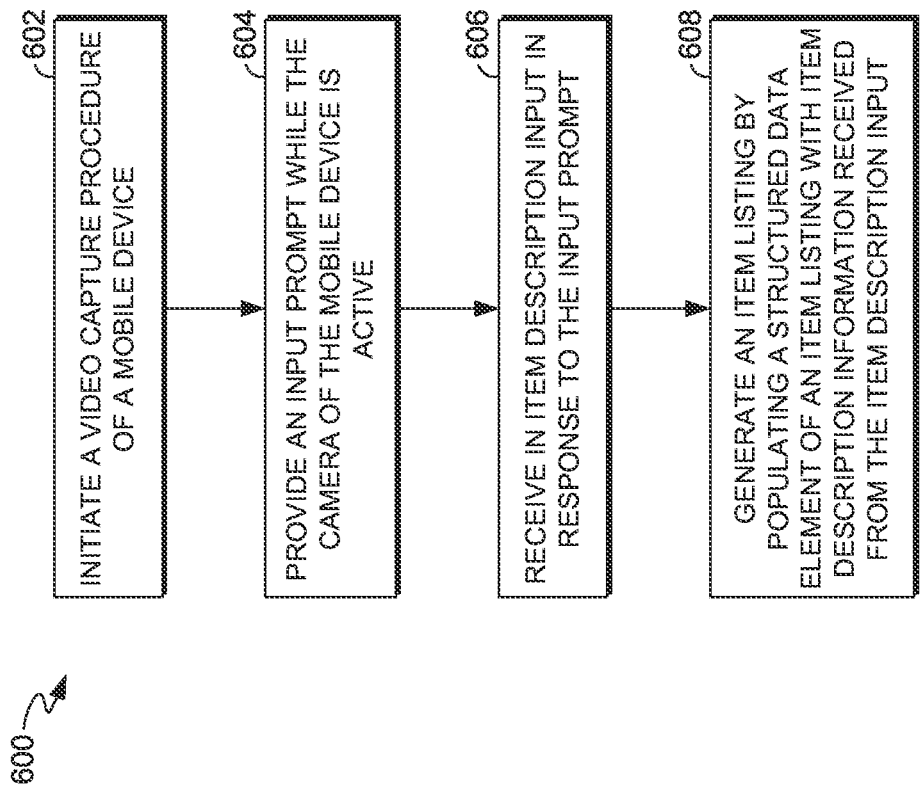
FIGS. 6-8 are block diagrams of example methods that may be performed using the video extraction and item listing engine of FIG. 2, in accordance with aspects described herein.
Figure 7:
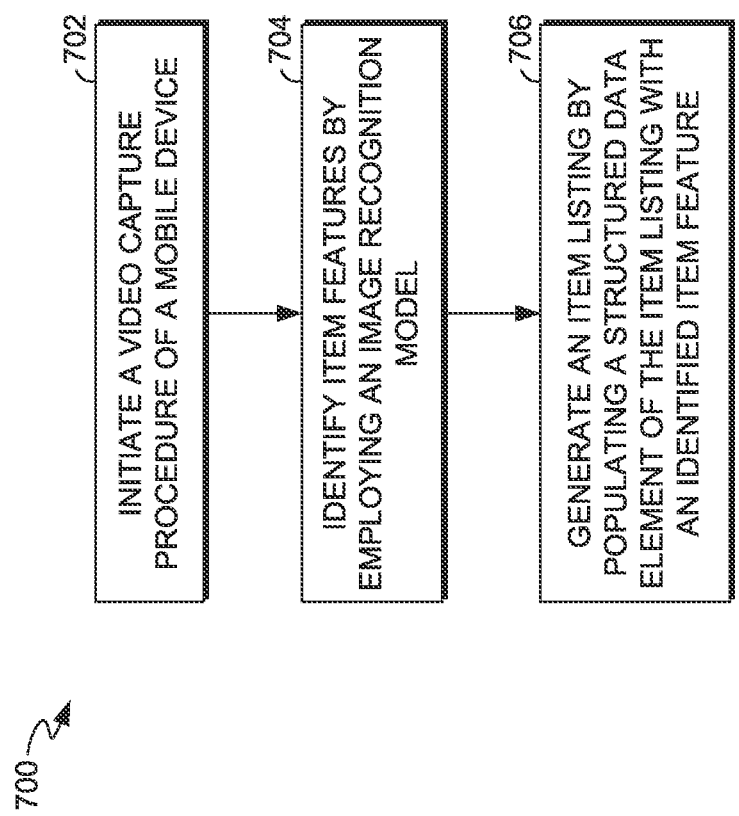
Figure 8:
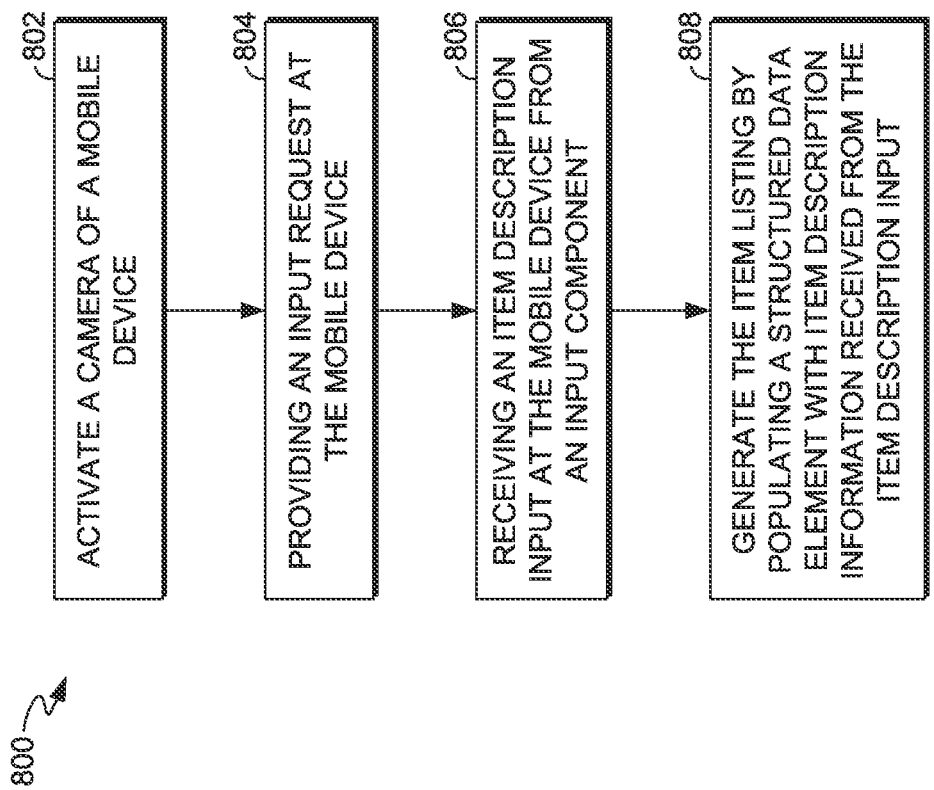

With reference to FIGS. 6, 7, and 8, block diagrams are provided to illustrate methods for extracting structured data using video. Some methods also include generating an item listing from the structured data. The methods may be performed by components of video extraction and item listing engine 200 of FIG. 2. In embodiments, one or more computer storage media having computer-executable instructions embodied thereon that when executed by a processor, cause the processor to perform the operations for extracting structured information from video and generating an item listing.

In view of this, FIG. 6 illustrates a block diagram of an example method 600 for extracting structured data using video. At block 602, a video capture procedure is initiated. The video capture procedure can be initiated using video initiator 202 of FIG. 2. The video capture procedure may activate a camera of a mobile device, and the mobile device, using the camera, can be used to capture an item listing video of an item. The video capture procedure may be initiated as part of an item listing process of a web-based item listing platform that provides item listings describing items. An item can be described by an item listing using structured data elements. These structured data elements can be populated with item information about item features. The structured data elements can each be associated with an item description type that relates to a type of item information.

At block 604, an input prompt is provided while the camera of the mobile device is active. This can be done using input promptor 204 of FIG. 2. The input prompt includes an input request for the user. The input request may correspond to a structured data element of the set of structured data elements. An input prompt may comprise a video input prompt including an audio input request, instructing the user to use the camera to capture item information, an audio input prompt including an audio input request instructing the user to use a microphone of the mobile device to capture item information, a dimensional input prompt including a dimensional input request instructing the user to use a scanning device or other device of the mobile device to capture dimensional information, or the like. The input prompts may include a command that causes the mobile device to provide the input request using a display, or may include a command that causes the mobile device to provide the input request using a speaker.

At block 606, an item description input is received. The item description input may be received from an input component of the mobile device. Some example item description inputs include video inputs, including an image or video captured in response to the video input request; audio inputs, including audible information, such as a human voice projecting item information, captured in response to the audio input request; dimensional input requests, including dimensional information captured in response to the dimensional input request; and the like.

At block 608, an item listing is generated. The item listing can be generated using item listing generator 210 of FIG. 2. The item listing may be generated by populating structured data elements, including a set of structured data elements, with item description information received from the inputs. Structured data elements can also be populated with item description information derived using an item identification model or an item feature identification model, such as those employed by item identifier 206 and item feature identifier 208 of FIG. 2. The item listing can be generated with any combination of the inputs and identified item description information. For instance, an item listing may comprise a first data element populated with item description information from the inputs, and comprises a second data element populated with item description information identified using any of the identification models. In another aspect, an item listing is populated with item description information related to the current location of a mobile device. While this could be provided alone, it could also be provided by populating a third structured data element. Likewise, generating the item listing may include populating a first structured data element with information derived from an identification model, and comprises a second structured data element populated with information determined from the inputs.

When generating the item listing, a structured data element of the set of structured data elements is populated with item description information associated with the item description type of the structured data element.

In some methods, the set of structured data elements may be selected based on identifying the item, such as recalling the set of structured data elements from an index based on the identified item being associated with the set of structured data elements in the index, or identified from a same or similar item listing.

Turning now to FIG. 7, an example method 700 for extracting structured information from a video is shown. At block 702, a video capture procedure of a mobile device is initiated. This may be done using video initiator 202 of FIG. 2. The initiated video capture procedure may also include any of those aspects previously discussed in relation to method 600.

At block 704, item features of the item are identified by employing an image recognition model. The image recognition model may comprise any of the models provided by machine learning models 218 and employed by item identifier 206 and item feature identifier 208 of FIG. 2. The image recognition model is configured to output an identity of the item features. The image recognition model can be configured by training the model on labeled data as previously discussed.

At block 706, the item listing is generated. The item listing can be generated and stored for use by the web-based item listing platform. The item listing may be generated by populating a structured data element of a set of structured data elements with an item feature identified by the image recognition model. The item features may correspond to the item description type of the structured data element. The item listing may also be generated to comprise any of those aspects discussed in regard to generating the item listing according to method 600.

With reference to FIG. 8, an example method 800 is provided for extracting structured data from a video. At block 802, a camera of a mobile device is activated as part of an item listing procedure. This can be done using video initiator 202 of FIG. 2. When activated, the camera may be capturing video or streaming visual video information within the field of view of the camera. The camera can be activated to capture an item listing video, including capturing and saving or streaming the visual information, of an item to generate an item listing for a web-based item listing platform.

The web-based item listing platform may comprise the item listings, which may individually comprise a set of structured data elements that can be populated with item description information to generate the item listing.

At block 804, an input prompt is provided. The input prompt may be provided at a mobile device so that an input request is provided by the mobile device using the display of the mobile device, the speaker of the mobile device, or any other output component associated with or in communication with the mobile device. In some cases, the input prompt is provided at the mobile device while the camera is active for the item listing video. The input prompt can be provided in any manner described herein, including those related to the discussion with respect to method 600 of FIG. 6 and method 700 of FIG. 7.

At block 806, an item description input may be received from an input component of the mobile device. That is, in response to the input prompt provided at the mobile device, the item description input may be received by the mobile device. Among other things, this may include automatically or in response to a manual user input capturing an image or video of the item at a particular orientation or showing a particular item feature, receiving audible information at a microphone of the mobile device or in communication with the mobile device, receiving dimensional information from a scanning device of the mobile device, receiving location information corresponding to a current location of the mobile device, or any other item description information from any input component of the mobile device.

At block 808, the item listing is generated for the item listing platform. The item listing can be generated by populating a structured data element with the item description information of the item description input. The item listing may be generated to include item description features, or any combination of item description features, described throughout this disclosure, including those described in the discussion of method 600 of FIG. 6 and method 700 of FIG. 7.

Having described an overview of embodiments of the present technology, an example operating environment in which embodiments of the present technology may be implemented is described below in order to provide a general context for the various aspects. Referring initially to FIG. 9, in particular, an example operating environment for implementing embodiments of the present technology is shown and designated generally as computing device 900. Computing device 900 is but one example of a suitable computing environment and is not intended to suggest any limitation as to the scope of use or functionality of the technology. Neither should computing device 900 be interpreted as having any dependency or requirement relating to any one or combination of components illustrated.

The technology of the present disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The technology may be practiced in a variety of system configurations, including hand-held devices, consumer electronics, general-purpose computers, more specialty computing devices, etc. The technology may also be practiced in distributed computing environments where tasks are performed by remote-processing devices that are linked through a communications network.

With continued reference to FIG. 9, computing device 900 includes bus 910 that directly or indirectly couples the following devices: memory 912, one or more processors 914, one or more presentation components 916, input/output ports 918, input/output components 920, and illustrative power supply 922. Bus 910 represents what may be one or more busses (such as an address bus, data bus, or combination thereof).

Although the various blocks of FIG. 9 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. This is the nature of the art, and it is reiterated that the diagram of FIG. 9 merely illustrates an example computing device that can be used in connection with one or more embodiments of the present technology. Distinction is not made between such categories as "workstation," "server," "laptop," "hand-held device," etc., as all are contemplated within the scope of FIG. 9 and reference to "computing device."

Computing device 900 typically includes a variety of computer-readable media. Computer-readable media can be any available media that can be accessed by computing device 900 and includes both volatile and nonvolatile media, removable and non-removable media. By way of example, and not limitation, computer-readable media may comprise computer storage media and communication media.

Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 900. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 912 includes computer storage media in the form of volatile or nonvolatile memory. The memory may be removable, non-removable, or a combination thereof. Example hardware devices include solid-state memory, hard drives, optical-disc drives, etc. Computing device 900 includes one or more processors that read data from various entities such as memory 912 or I/O components 920. Presentation component(s) 916 present data indications to a user or other device. Examples of presentation components include a display device, speaker, printing component, vibrating component, etc.

I/O ports 918 allow computing device 900 to be logically coupled to other devices including I/O components 920, some of which may be built in. Illustrative components include a microphone, joystick, game pad, satellite dish, scanner, printer, wireless device, speaker, etc.

Embodiments described above may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of the present technology is described with specificity herein to meet statutory requirements. However, the description itself is not intended to limit the scope of this disclosure. Rather, the inventors have contemplated that the claimed or disclosed subject matter might also be embodied in other ways, to include different steps or combinations of steps similar to the ones described in this document, in conjunction with other present or future technologies. Moreover, although the terms "step" or "block" might be used herein to connote different elements of methods employed, the terms should not be interpreted as implying any particular order among or between various steps herein disclosed unless and except when the order of individual steps is explicitly stated.

For purposes of this disclosure, the word "including" has the same broad meaning as the word "comprising," and the word "accessing" comprises "receiving," "referencing," or "retrieving." Further, the word "communicating" has the same broad meaning as the word "receiving," or "transmitting" facilitated by software or hardware-based buses, receivers, or transmitters using communication media described herein. Also, the word "initiating" has the same broad meaning as the word "executing" or "instructing" where the corresponding action can be performed to completion or interrupted based on an occurrence of another action. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present technology are described with reference to a distributed computing environment; however, the distributed computing environment depicted herein is merely an example. Components can be configured for performing novel aspects of embodiments, where the term "configured for" or "configured to" can refer to "programmed to" perform particular tasks or implement particular abstract data types using code. Further, while embodiments of the present technology may generally refer to a system for extracting structured data and the schematics described herein, it is understood that the techniques described may be extended to other implementation contexts.

From the foregoing, it will be seen that this technology is one well adapted to attain all the ends and objects described above, including other advantages that are obvious or inherent to the structure. It will be understood that certain features and subcombinations are of utility and may be employed without reference to other features and subcombinations. This is contemplated by and is within the scope of the claims. Since many possible embodiments of the described technology may be made without departing from the scope, it is to be understood that all matter described herein or illustrated in the accompanying drawings is to be interpreted as illustrative and not in a limiting sense.

One example that can be derived from the foregoing description includes A computer-implemented method for extracting structure data using video, the method comprising: initiating a video capture procedure to activate a camera of a mobile device for capturing an item listing video of an item, the video capture procedure initiated as part of an item listing procedure for listing the item at a web-based item listing platform, wherein the item is described by an item listing of the item listing platform using a set of structured data elements, each structured data element being associated with an item description type; providing an input prompt while the camera of the mobile device is active, the input prompt including an input request that corresponds to a structured data element of the set of structured data elements; receiving from an input component of the mobile device an item description input in response to the input request; and generating the item listing for the item listing platform by populating the structured data element of the set of structured data elements with an item description based on the item description input. The method may also include the input being an audio input request, and the input component is a microphone of the mobile device, the input request requesting a specific item feature. The method may also include detecting an audio response including the specific item feature in response to the audio input request, wherein the audio response is used to populate the structured data element with the specific item feature when generating the item listing.

Another example that maybe derived from the foregoing disclosure includes one or more computer storage media storing computer-executable instructions that when executed by a processor, cause the processor to perform operations for extracting structured data using video, the operations comprising: activating a camera of a mobile device to capture an item listing video, the camera being activated as part of an item listing procedure for listing the item at a web-based item listing platform, wherein the item is described by an item listing of the item listing platform using a set of structured data elements, each structured data element being associated with an item description type; providing an input request while the camera of the mobile device is active that corresponds to a structured data element of the set of structured data elements; receiving from an input component of the mobile device an item description input in response to the input request; and generating the item listing for the item listing platform by populating the structured data element of the set of structured data elements with an item description based on the item description input.

What is claimed is:

1. A computer-implemented method for extracting structured data using video, the method comprising:
    initiating a video capture procedure to activate a camera of a mobile device for capturing an item listing video of an item, the video capture procedure initiated as part of an item listing procedure for listing the item at a web-based item listing platform, wherein the item is described by an item listing of the item listing platform using a set of structured data elements, each structured data element being associated with an item description type;
    identifying item features of the item by employing an image recognition model, the image recognition model comprising a machine learning model trained to output the item features from an input of the item listing video, wherein the item features are identified based on an input prompt, the input prompt causing the mobile device to provide an input request via an output component, the input request comprising requesting an action or information for facilitating identification, by the image recognition model, of an item feature of the item being captured in the item listing video, the item feature corresponding to the item description type of a structured data element, and the input request being provided while the camera is capturing the item listing video; and
    generating the item listing for the item listing platform by populating the structured data element with the item feature identified from the image recognition model.

2. The method of claim 1, wherein the input prompt is provided as a video input prompt and the input request is a video input request that requests a specific item orientation of the item relative to the camera, the video input prompt initiated based on the image recognition model identifying the item feature, wherein the specific item orientation is requested to position the item feature within a field of view of the camera.

3. The method of claim 2, further comprising:
    detecting that an item orientation of the item corresponds to the specific item orientation of the video input request; and
    in response to detecting the item orientation of the item corresponds to the specific item orientation of the video input request, initiating an image capture procedure to capture a still image of the item feature, wherein the still image is used to populate the structured data element when generating the item listing.

4. The method of claim 1, wherein the input prompt is provided as an audio input prompt and the input request is an audio input request requesting information about the item feature in response to the requested information being unidentifiable in the item listing video.

5. The method of claim 4, further comprising detecting an audio response including the information about the item feature in response to the audio input request, wherein the audio response is used to populate the structured data element with the specific item feature when generating the item listing.

6. The method of claim 1, further comprising:
    initiating, as part of the video capture procedure, a three-dimensional scanner of the mobile device; and
    from an output of the three-dimensional scanner, determining a size of the item, wherein another structured data element is populated with the size of the item.

7. The method of claim 1, further comprising selecting the set of structured data elements based on identifying the item using the image recognition model.

8. A system for extracting structured data using video, the system comprising:
    at least one processor; and
    computer storage media storing computer-executable instructions that, when executed, cause the at least one processor to perform a method comprising:
        initiating a video capture procedure to activate a camera of a mobile device for capturing an item listing video of an item during an item listing procedure, wherein the item is described by an item listing of a web-based item listing platform using a set of structured data elements, each structured data element being associated with an item description type;
        identifying item features of the item by employing an image recognition model, the image recognition model comprising a machine learning model trained to output the item features from an input of the item listing video, wherein the item features are identified based on an input prompt, the input prompt causing the mobile device to provide an input request via an output component, the input request requesting an action or information for facilitating identification, by the image recognition model, of an item feature of the item being captured in the item listing video, the item feature corresponding to the item description type of a structured data element, and the input request being provided while the camera is capturing the item listing video; and
        generating the item listing for the item listing platform by populating the structured data element with the item feature identified by the image recognition model.

9. The system of claim 8, further comprising:
identifying the item using the image recognition model; and
selecting the set of structured data elements based on the item, wherein the item features are identified based on the set of structured data elements that is selected.

10. The system of claim 8, further comprising:
receiving, from an input component of the mobile device, an item description input in response to the input request, wherein a second structured data element is populated with the item description input to generate the item listing.

11. The system of claim 8, wherein the input request is a video input request to position the item in an orientation where the image recognition model can identify the item feature by positioning the item feature within a field of view of the camera.

12. The system of claim 11, wherein the input prompt instructs the video input request to be provided at a display of the mobile device.

13. The system of claim 11, wherein the input prompt instructs the video input request to be provided by a speaker of the mobile device.

14. One or more computer storage media storing computer-executable instructions that when executed by a processor, cause the processor to perform operations for extracting structured data using video, the operations comprising:
activating a camera of a mobile device to capture an item listing video, the camera being activated as part of an item listing procedure for listing the item at a web-based item listing platform, wherein the item is described by an item listing of the item listing platform using a set of structured data elements, each structured data element being associated with an item description type;
capturing images of item features within the video using the camera, wherein capturing the images of the item features causes an image recognition model to identify the item features, the image recognition model comprising a machine learning model trained to output the item features from an input of the images captured by the camera, wherein the item features are identified based on an input prompt, the input prompt causing the mobile device to provide an input request via an output component, the input request requesting an action or information for facilitating identification, by the image recognition model, of an item feature of the item being captured in the item listing video, the item feature corresponding to the item description type of a structured data element, and the input request being provided while the camera is capturing the item listing video; and
causing generation of the item listing by communicating the images captured by the camera to the item listing platform for populating the structured data element with the item feature identified from the image recognition model.

15. The media of claim 14, wherein the input request is a video input request, the video input request requesting a specific item orientation of the item relative to the camera, and wherein the input prompt is initiated based on the image recognition model identifying the item feature, wherein the specific item orientation is requested to position the item feature within a field of view of the camera.

16. The media of claim 14, wherein the input request is an audio input request requesting information about the item feature based on the requested information being unidentifiable in the item listing video, and the operations further comprise receiving at a microphone of the mobile device an audio response in response to the audio input request, the audio response being used to populate another structured data element when the item listing is generated.

17. The media of claim 16, wherein the audio input request is provided at a display of the mobile device.

18. The media of claim 16, wherein the audio input request is provided by a speaker of the mobile device.

19. The media of claim 14, wherein the input request is a dimensional input request, and the operations further comprise determining a size of the item using a three-dimensional scanner in response to the dimensional input request, the size of the item being used to populate another structured data element when the item listing is generated.

20. The media of claim 14, further comprising identifying the item using the image recognition model, wherein the set of structured data elements is selected based on the item being identified by the image recognition model.

* * * * *